United States Patent
Chang

(10) Patent No.: US 6,757,517 B2
(45) Date of Patent: Jun. 29, 2004

(54) APPARATUS AND METHOD FOR COORDINATED MUSIC PLAYBACK IN WIRELESS AD-HOC NETWORKS

(76) Inventor: Chin-chi Chang, F7-2, No. 71, Tung-An Street, Taipei (TW)

( * ) Notice: Subject to any disclaimer, the term of this patent is extended or adjusted under 35 U.S.C. 154(b) by 622 days.

(21) Appl. No.: 09/853,728

(22) Filed: May 10, 2001

(65) Prior Publication Data

US 2002/0168938 A1 Nov. 14, 2002

(51) Int. Cl.$^7$ ................................................. H04H 1/00
(52) U.S. Cl. .................... 455/3.05; 455/3.06; 455/41.2; 455/45; 455/186.1
(58) Field of Search ............................... 455/186.1, 45, 455/3.01, 3.04, 3.05, 3.09, 41.1, 41.2, 186.2, 517–518, 66.1; 725/86.7; 709/718, 719, 729

(56) References Cited

U.S. PATENT DOCUMENTS

| | | | |
|---|---|---|---|
| 5,616,876 A | | 4/1997 | Cluts |
| 5,812,937 A | * | 9/1998 | Takahisa et al. ............ 455/66.1 |
| 5,819,160 A | * | 10/1998 | Foladare et al. .............. 455/45 |
| 6,014,569 A | | 1/2000 | Bottum |
| 6,490,432 B1 | * | 12/2002 | Wegener et al. ........... 455/3.05 |
| 2002/0132616 A1 | * | 9/2002 | Ross et al. .................. 455/419 |

* cited by examiner

Primary Examiner—Lee Nguyen
Assistant Examiner—Tuan Tran

(57) ABSTRACT

The present invention details a novel application of wireless networking and digital music technologies to achieve coordinated and synchronized music playback among peer listeners connected by wireless ad-hoc networks. Two or more listeners in local proximity allowed by short-range wireless transmission can participate and listen to the same song at the same time. Moreover, the present invention allows listeners in the transmission range to discover each other through profile matching. A high matching score may indicate similar preference or taste to a certain music style thereby easily locating mutual interests, which would not have been possible.

32 Claims, 4 Drawing Sheets

APPARATUS AND METHOD FOR COORDINATED MUSIC PLAYBACK IN WIRELESS AD-HOC NETWORKS

BACKGROUND OF THE INVENTION

1. Field of Invention

The present invention relates to a method and an apparatus for music playback. More particularly, the present invention relates to a method and an apparatus for coordinated and synchronized music playback in local spatial proximity with wireless ad hoc networks.

2. Description of Related Art

Traditional portable musical entertainment, best exemplified by Walkman and portable CD players, is usually confined to individual listeners. In general, for a group of music listeners to share mutual music listening, the only way is to play music loudly to the open space. However, it might cause nuisances to other persons, who have no intention for listening, while the music is playing loudly. Therefore, it is advantageous for music sharers to confine mutual music sharing to only persons who intend to listen.

With leaping advances in wireless networking and digital music technologies such as Bluetooth and MP3, portable musical entertainment can be shared and appreciated simultaneously by more than one person without playing music out loudly. Furthermore, music sharers can decide to appreciate mutual musical entertainment simultaneously with only the chosen sharers.

Prior art relating to music carrying radio lacks the mechanisms and methods to achieve the aforementioned objective. For example, Bottum (U.S. Pat. No. 6,014,569) uses cellular communication systems to deliver asynchronous audio to subscribers. There is no mechanism to ensure synchronous audio reception and playback among the logged-on subscribers. Cluts (U.S. Pat. No. 5,616,876) asks user to select songs from a collection to form a preferred song list. The computer server then analyzes this list to suggest more songs similar to user preference. There is no method to suggest how two or multiple users can match their mutual preference to music.

SUMMARY OF THE INVENTION

In view of the foregoing, it is an objective of the present invention to provide a method and an apparatus that use wireless ad-hoc networks to coordinate and synchronize song playback between two or more users who wish to share mutual music listening.

The present invention details a novel application of wireless networking and digital music technologies to achieve coordinated and synchronized music playback among peer listeners connected by wireless ad-hoc networks. Two or more listeners in local proximity allowed by short-range wireless transmission can participate and listen to the same song at the same time. Moreover, the present invention allows listeners in the transmission range to discover each other through profile matching. A high matching score may indicate similar preference or taste to a certain music style thereby easily locating mutual interests, which would not have been possible.

As embodied and broadly described herein, the invention provides a method and an apparatus for coordinated and synchronized music playback in local spatial proximity with wireless ad hoc networks. The playback/listening system includes at least two or more playback/listening apparatus used respectively by at least two or more users. The playback/listening apparatus enhanced with profile matching functionality comprises four key components: a wireless transceiver, a random access controller, a profile storage and matching unit, and a music playback unit. The playback/listening apparatus can operate in at least two modes, listening mode and advertising mode, for profile matching. These two modes constitute two basic and necessary functionality.

The method for coordinated and synchronized music playback in local spatial proximity with wireless ad hoc networks includes the following steps: establishing a wireless ad-hoc network between at least a first listening apparatus used by the first user and a second listening apparatus used by the second user; sending a first message from the first apparatus to a public channel; scanning the public channel and receiving the first message to the second apparatus; responding to the first apparatus by sending a second message from the second apparatus to direct the first apparatus to a private channel; sending a first profile from the first apparatus to the private channel; performing matching evaluation between the first profile and a second profile of the second apparatus in the second apparatus based on a specific criterion; sending the second profile to the first apparatus; performing matching evaluation between the second profile and the first profile in the first apparatus; selecting a song; synchronizing playing the song; scanning the public channel and receiving the first message to a third apparatus used by a third user over the wireless ad-hoc network; responding to the third apparatus by sending a third message from the first apparatus to direct the third apparatus to the private channel; and synchronizing playing the song in the apparatuses.

The present invention relates to an apparatus for coordinated and synchronized music playback in local spatial proximity through wireless ad hoc networks. With the apparatus of the present invention, peer listeners can share music listening without playing the music out loudly.

The present invention allows listeners in the transmission range to discover one another through profile matching, thereby locating the music public based on matched profiles. The present invention therefore has potential applications in sociality, merchandising, or marketing.

The invention and the attendant advantages thereof will be better understood by reference to the following detailed description when considered in connection with the accompanying figures.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

The present invention provides a method for providing coordinated and synchronized music playback at the same time for two or more listeners in local proximity and a music playback/listening system for applying the aforementioned method.

Figure 1:
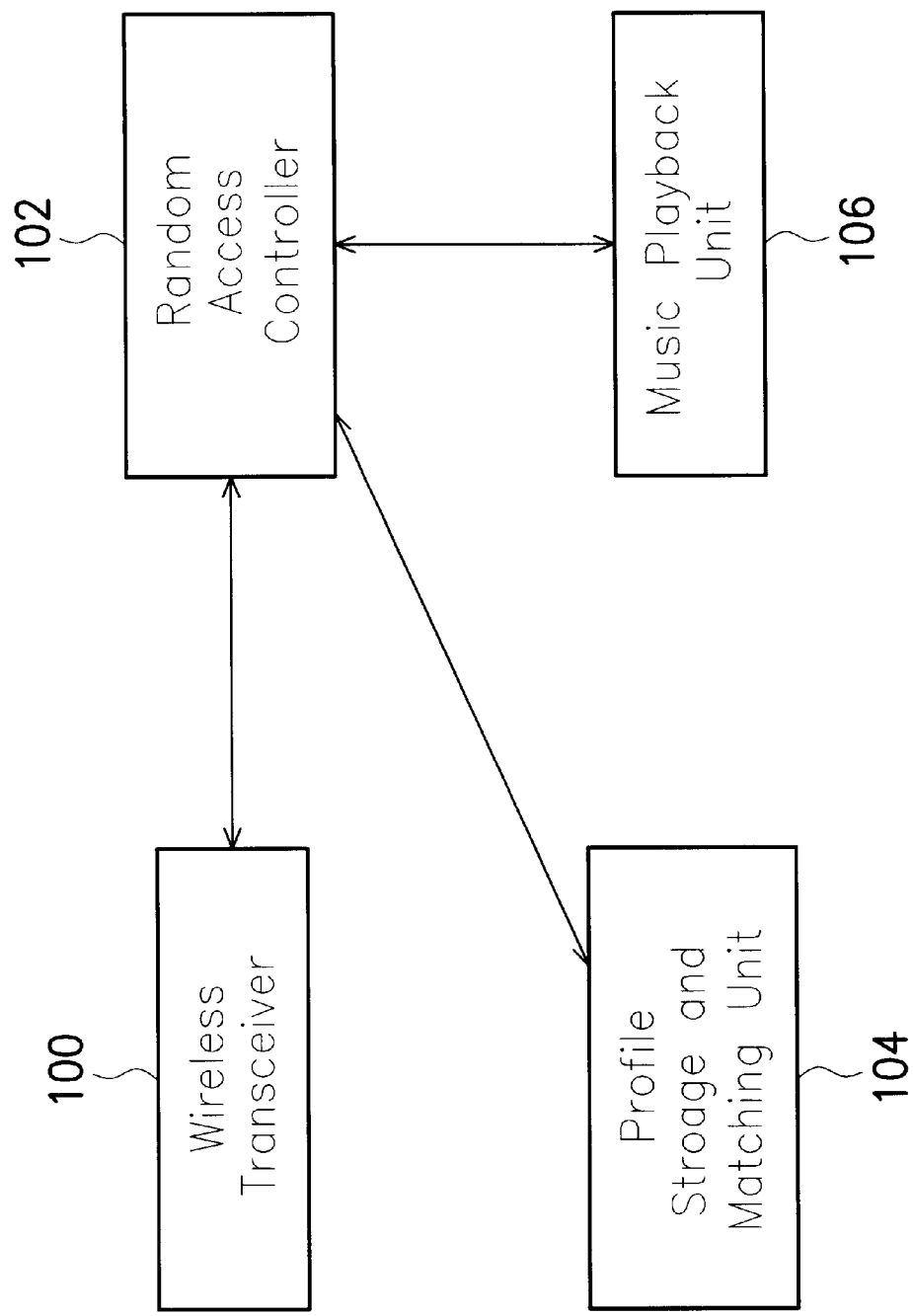
FIG. 1 is a schematic view of the four key components of an apparatus in a system according to one preferred embodiment of this invention.

The aforementioned playback/listening system includes at least two or more playback/listening apparatus used respectively by at least two or more users. The playback/listening apparatus can be simplified to have no profile matching capability or be further enhanced and enriched with profile matching capability. FIG. 1 illustrates four key components of the apparatus for the playback/listening system, comprising a wireless transceiver (100), a random access controller (102), a profile storage and matching unit (104), and a music playback unit (106). The wireless transceiver (100) can be implemented by any short-range radio technology, such as but not limited to Bluetooth, 802.11, or DECT. The transceiver constantly listens to a pre-programmed public channel for new, remote parties. It can also connect to a remote party through an assigned private channel. The random access controller (102) instructs which channel the wireless transceiver should be sending or receiving messages. It also determines the frequency of advertising the presence of the apparatus to other remote parties. The profile storage and matching unit (104) stores the musical preference of the user as a local profile and performs matching between the local profile and a received profile from a remote party. For example, a profile can be as simple as a list of songs stored in the playback unit or even a whole record including music playing history. High matching scores thus generally indicate similarity in music preference and taste between users. A nine-out-of-ten match between two song lists is considered strong matching. No intersection indicates low or no matching. The user can set up a criterion to decide whether the degree of matching is appropriate. Other possible matching criteria include music style, release dates, singer, conductor, and song writers etc. The profile matching function can also be implemented by displaying the profile of the remote party on screen. Human user then reviews and decides to accept or reject through conventional selecting means, for example, pressing a button or a switch. The music playback unit (106) can be a digital device that stores and plays songs. The unit may be implemented based on but not limited to MP3, MIDI and other digital audio technologies.

The enhanced playback/listening apparatus can operate in at least two or more modes for profile matching. One mode is named "listening mode" while another is named "advertising mode". These two modes constitute two basic and necessary functionality.

Figure 2:
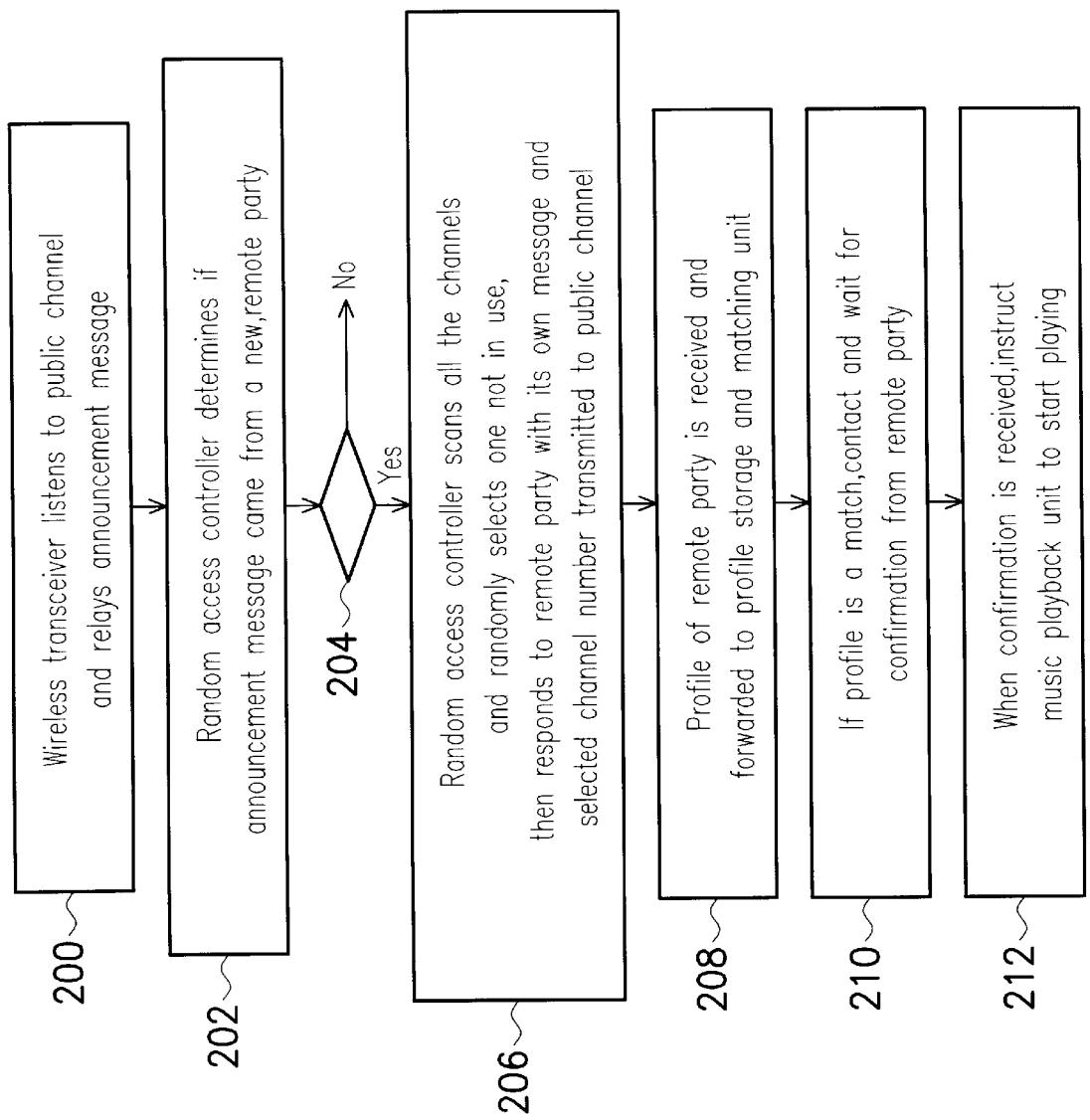
FIG. 2 is a flow diagram illustrating the processing steps when the system is in the listening mode according to one preferred embodiment of this invention.

FIG. 2 illustrates the processing steps when the apparatus operates in the listening mode. In this mode, the wireless transceiver scans the public channel for newly joined remote parties, which send out announcements containing their signatures (200). Messages and announcements are digital data packets like Internet Protocol (IP) packets. Each apparatus has a factory assigned unique signature. The announcement message from a remote party is relayed to the random access controller, which examines the signature of the remote party (202). The random access controller keeps a list of signatures from recently contacted but failed parties. Failed parties need not be contacted again. If the new signature is not in the list, the random access controller then instructs the wireless transceiver to scan for private channels not in use. The random access controller then selects one available private channel, and responds to the remote party with a new message containing the number of this channel (206). Future correspondence between the two parties will use the established private channel.

Upon receiving the response to its announcement message, the remote party sends its profile through the private channel (208). The profile matching unit at the local apparatus (used by the local party) then performs matching evaluation. If it is a good match, the local apparatus sends its own profile to the remote party for verification and confirmation (210). The remote party performs its matching and if it agrees to proceed, sends out confirmation and selects a song that appears in both profiles to play. Both parties then synchronize and play the selected song at the same time (212). The aforementioned step can be referred as "local playback". However, if the selected song is present in only one party (i.e. either the local or the remote party), the selected song needs to be transmitted to another party in order to be played at the same time, thus referring as "radio-in playback" hereafter. It depends on the available bandwidth of the wireless, ad-hoc network to decide whether local playback or radio-in playback can be applied. In the listening mode, the system passively waits for new announcements. The above flow diagram applies equally to two party-linking as well as multi-party linking.

For a more complicated scenario of the method with profile matching, a wireless ad-hoc network between at least a first listening apparatus in advertising mode and a second listening apparatus in listening mode is first established. After the first apparatus sends a signature to a public channel, the second apparatus scans the public channel and detect the signature of the first apparatus. The second apparatus then responds to the first apparatus by sending a message to direct the first apparatus to a private channel. The first apparatus sends its profile to the private channel. Afterwards, the second apparatus performs matching evaluation between its own profile and the profile of the first apparatus in the second apparatus based on a specific criterion. If the criterion is met, the second apparatus sends its profile to the first apparatus. After the first apparatus performing matching evaluation between both profiles in the first apparatus, both apparatuses synchronize playing the song. The selected song can be played either in local playback or radio-in playback.

Figure 3:
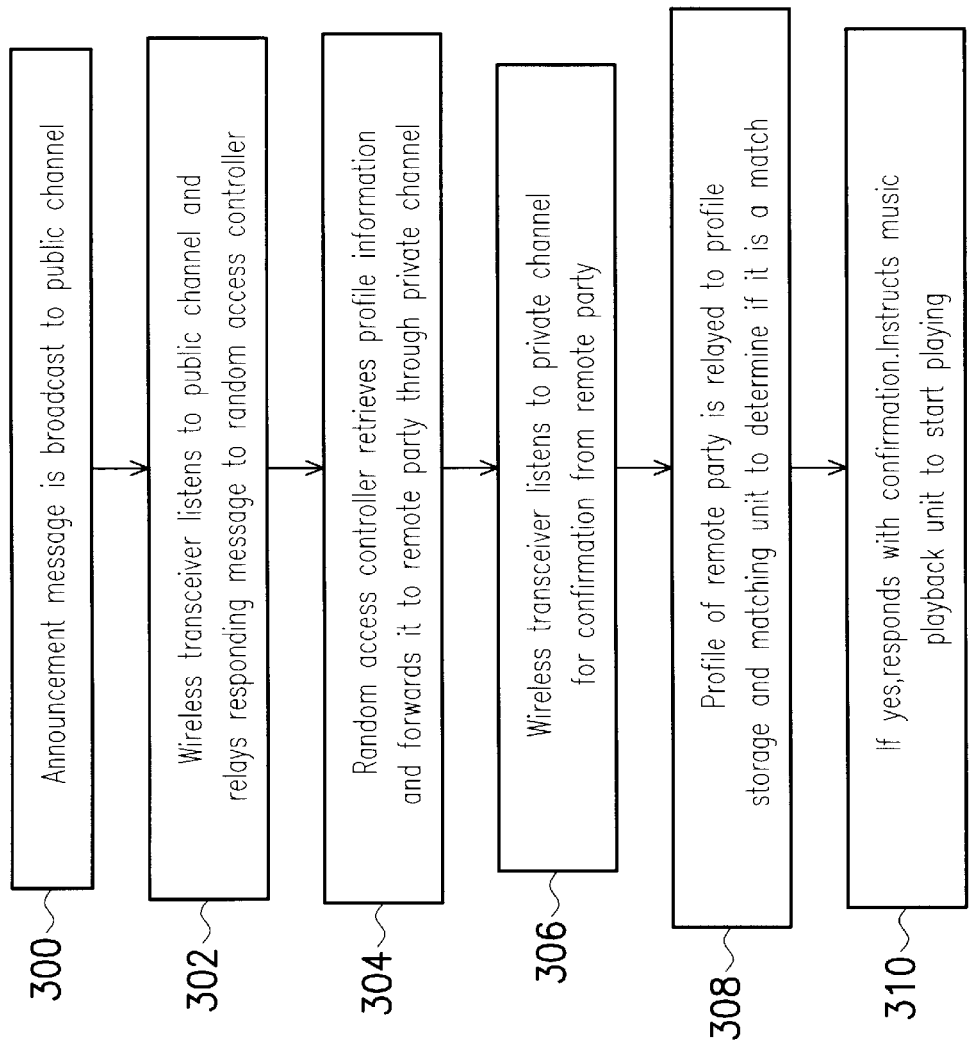
FIG. 3 is a flow diagram illustrating the processing steps when the system is in the advertising mode according to one preferred embodiment of this invention.

Multiple parties can be joined together one at a time by responding to the announcement, which is described next. FIG. 3 illustrates the processing steps when the system operates in the advertising mode. In this mode, the local system actively seeks for profile-matched remote parties. It first sends out announcement with its own signature (300). The wireless transceiver then listens to the public channel for responses and relays the responses, one at a time, to the random access controller (302). For each response, the controller retrieves the local profile and forwards it to the remote party for profile matching (304). If the remote party responds with positive confirmation, the profile of the remote party is matched locally (308). A good match will then leads to the selection of a matched song for playback (310).

When two or more devices (referred as the playback group) are participating in synchronized playback, a new apparatus (using by a new party) may join by responding to the announcement message from the advertising apparatus. The interactions between the new apparatus and the advertising apparatus follow the same procedure illustrated in FIG. 3. There is one more step after (310). In this step, the advertising apparatus, which is participating in the playback, sends out a channel reset message to the newly joined device. The channel reset message contains the channel number shared by the playback group. The newly joined device then switches and listens to the shared channel number in order to synchronize its playback with the playback group. At this point, the newly joined device is part of the playback group. A playback group may be formed by inviting new devices one at a time following the above procedure.

It is noted that multi-party synchronized playback assumes that at least one song is available on all apparatuses or one device will actively transmit songs over the wireless channel. Enforcing the criterion can be easily imposed by the advertising device, which exchanges and stores profile information with others.

Music playback can continue when the system operates in either mode, listening or advertising. It is up to the owner to decide what to do when a new match is found. The owner may elect to continue the current playback, or to start with a new song.

Figure 4:
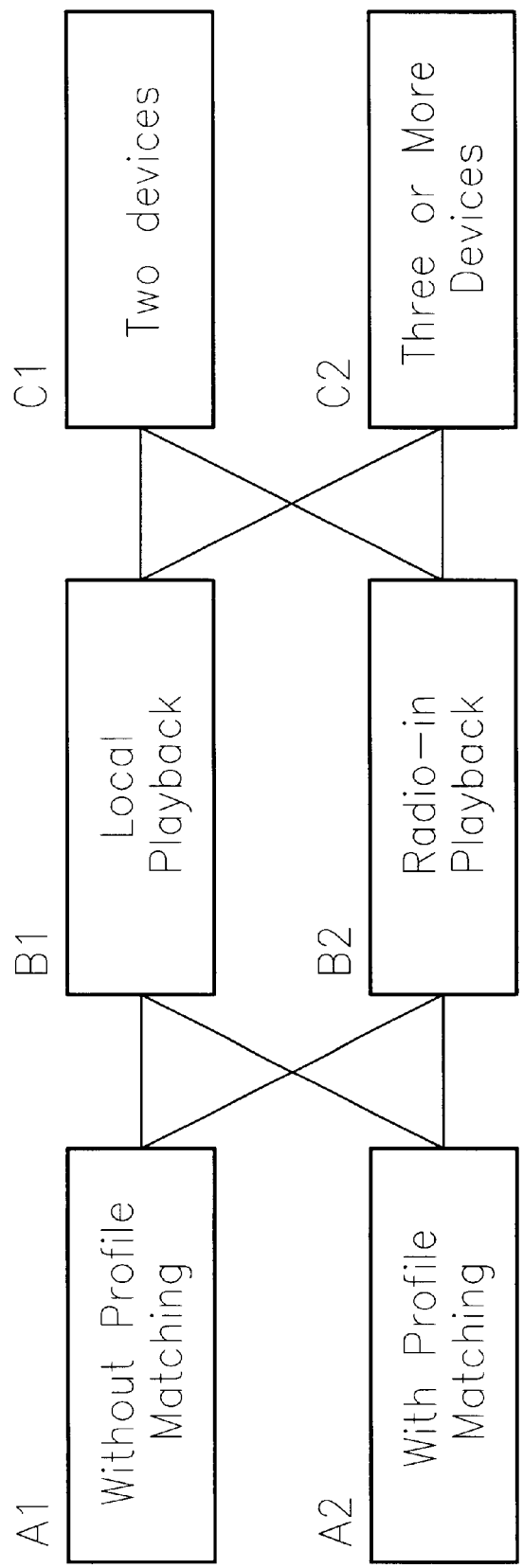
FIG. 4 is a functional diagram illustrating various combinations of matching and playback functions that the listening apparatus may choose to implement according to one preferred embodiment of this invention.

It is noted that the method of this invention for interactively playing music between multiple users can be summarized as combinations according to FIG. 4. FIG. 4 is a functional diagram illustrating various combinations of matching and playback functions a listening apparatus may choose to implement. The simplest case of this invention is the combination of A1-B1-C1, as a playback/listening system having two interactive listening apparatuses without profile matching and in local playback. This simple scenario is within the scope of the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for interactively playing music between multiple users, including at least a first user and a second user, comprising the steps of:

establishing a wireless ad-hoc network between at least a first listening apparatus used by the first user and a second listening apparatus used by the second user;

sending a first message from the first apparatus to a public channel;

scanning the public channel and receiving the first message to the second apparatus;

responding to the first apparatus by sending a second message from the second apparatus to direct the first apparatus to a private channel;

sending a first profile from the first apparatus to the private channel;

performing matching evaluation between the first profile and a second profile of the second apparatus in the second apparatus based on a specific criterion, wherein only if the criterion is met, the second profile will be sent out;

sending the second profile to the first apparatus;

performing matching evaluation between the second profile and the first profile in the first apparatus;

selecting a song from the first and the second profiles by the first apparatus; and synchronizing playing the song in the first and the second apparatuses.

2. The method as claimed in claim 1, wherein after the step of synchronizing playing the song, the method can further include the following steps:

scanning the public channel and receiving the first message to a third apparatus used by a third user over the wireless ad-hoc network;

responding to the third apparatus by sending a third message from the first apparatus to direct the third apparatus to the private channel; and synchronizing playing the song in the first, the second and the third apparatuses.

3. The method as claimed in claim 1, wherein the step of establishing the wireless ad-hoc network comprises performing short-range radio technologies.

4. The method as claimed in claim 1, wherein the step of sending the first message from the first apparatus comprises sending a first signature of the first apparatus as identification.

5. The method as claimed in claim 1, wherein the step of responding to the first apparatus by sending a second message from the second apparatus comprises sending a second signature of the second apparatus as identification.

6. A method for interactively playing music between multiple users, including at least a first user and a second user, comprising the steps of:

establishing a wireless ad-hoc network between at least a first listening apparatus used by the first user and a second listening apparatus used by the second user;

sending a first message from the first apparatus to a public channel;

scanning the public channel and receiving the first message to the second apparatus;

responding to the first apparatus by sending a second message from the second apparatus to direct the first apparatus to a private channel;

selecting a song; and synchronizing playing the song in the apparatuses.

7. The method as claimed in claim 6, wherein after the step of responding to the first apparatus by sending a second message from the second apparatus, the method can further include the following steps:

sending a first profile from the first apparatus to the private channel;

performing matching evaluation between the first profile and a second profile of the second apparatus in the second apparatus based on a specific criterion, wherein only if the criterion is met, the second profile will be sent out;

sending the second profile to the first apparatus;

performing matching evaluation between the second profile and the first profile in the first apparatus.

8. The method as claimed in claim 6, wherein after the step of synchronizing playing the song, the method can further include the following steps:

scanning the public channel and receiving the first message to a third apparatus used by a third user over the wireless ad-hoc network;

responding to the third apparatus by sending a third message from the first apparatus to direct the third apparatus to the private channel; and synchronizing playing the song in the first, the second and the third apparatuses.

9. The method as claimed in claim 6, wherein after the step of responding to the first apparatus by sending a second message from the second apparatus, the method can further include the following steps:

sending a first profile from the first apparatus to the private channel;

performing matching evaluation between the first profile and a second profile of the second apparatus in the second apparatus based on a specific criterion, wherein only if the criterion is met, the second profile will be sent out;

sending the second profile to the first apparatus;

performing matching evaluation between the second profile and the first profile in the first apparatus;

after synchronizing playing the song, scanning the public channel and receiving the first message to a third apparatus used by a third user over the wireless ad-hoc network;

responding to the third apparatus by sending a third message from the first apparatus to direct the third apparatus to the private channel; and synchronizing playing the song in the first, the second and the third apparatuses.

10. The method as claimed in claim 6, wherein the step of establishing the wireless ad-hoc network comprises performing short-range radio technologies.

11. The method as claimed in claim 6, wherein the step of sending the first message from the first apparatus comprises sending a first signature of the first apparatus as identification.

12. The method as claimed in claim 6, wherein the step of responding to the first apparatus by sending a second message from the second apparatus comprises sending a second signature of the second apparatus as identification.

13. A method for interactively playing music between multiple users, including at least a first user and a second user, comprising the steps of:

establishing a wireless ad-hoc network between at least a first listening apparatus used by the first user and a second listening apparatus used by the second user;

exchanging a sequence of messages between the first apparatus and the second apparatus;

selecting a song; and synchronizing playing the song in the apparatuses.

14. The method as claimed in claim 13, wherein the step of exchanging a sequence of messages between the first apparatus and the second apparatus further comprises:

sending a first message from the first apparatus to a public channel;

scanning the public channel and receiving the first message to the second apparatus; and responding to the first apparatus by sending a second message from the second apparatus to direct the first apparatus to a private channel.

15. The method as claimed in claim 14, wherein after the step of responding to the first apparatus by sending a second message from the second apparatus, the method can further include the following steps:

sending a first profile from the first apparatus to the private channel;

performing matching evaluation between the first profile and a second profile of the second apparatus in the second apparatus based on a specific criterion, wherein only if the criterion is met, the second profile will be sent out;

sending the second profile to the first apparatus;

performing matching evaluation between the second profile and the first profile in the first apparatus.

16. The method as claimed in claim 14, wherein after the step of responding to the first apparatus by sending a second message from the second apparatus, the method can further include the following steps:

sending a first profile from the first apparatus to the private channel;

performing matching evaluation between the first profile and a second profile of the second apparatus in the second apparatus based on a specific criterion, wherein only if the criterion is met, the second profile will be sent out;

sending the second profile to the first apparatus;

performing matching evaluation between the second profile and the first profile in the first apparatus;

after synchronizing playing the song, scanning the public channel and receiving the first message to a third apparatus used by a third user over the wireless ad-hoc network;

responding to the third apparatus by sending a third message from the first apparatus to direct the third apparatus to the private channel; and synchronizing playing the song in the first, the second and the third apparatuses.

17. The method as claimed in claim 14, wherein the step of sending the first message from the first apparatus comprises sending a first signature of the first apparatus as identification.

18. The method as claimed in claim 14, wherein the step of responding to the first apparatus by sending a second message from the second apparatus comprises sending a second signature of the second apparatus as identification.

19. The method as claimed in claim 13, wherein after the step of synchronizing playing the song, the method can further include the following steps:

scanning the public channel and receiving the first message to a third apparatus used by a third user over the wireless ad-hoc network;

responding to the third apparatus by sending a third message from the first apparatus to direct the third apparatus to the private channel; and synchronizing playing the song in the first, the second and the third apparatuses.

20. The method as claimed in claim 13, wherein the step of establishing the wireless ad-hoc network comprises performing short-range radio technologies.

21. An interactive multi-party linking music listening system comprising at least two listening apparatuses communicating over a wireless ad-hoc network, wherein one of the listening apparatuses is a first listening apparatus, the first listening apparatus at least comprising:

a first signature to identify the first listening apparatus;

a plurality of channels for communicating between the listening apparatuses, wherein the channels include at least one public channel for advertising the first signature;

a controlled interface for enabling interactive communication over the wireless ad-hoc network;

a random access controller for instructing the channels to be in use and storing signatures of listening apparatuses other than the first listening apparatus;

a wireless transceiver connected to the random access controller, for receiving and sending messages over the wireless ad-hoc network and relaying messages to the random access controller;

a profile storage and matching unit connected to the random access controller, for storing music preference as a first profile and perform matching between profiles of the listening apparatuses other than the first listening apparatus; and a music playback unit connected to the random access controller, for storing and playing music, whereby the first listening apparatus can synchronize playing music with the listening apparatuses other than the first listening apparatus with agreement from all parties.

22. The system as claimed in claim 21, wherein the wireless transceiver is implemented by short-range radio technologies.

23. The system as claimed in claim 21, wherein the wireless transceiver is implemented by a Bluetooth technology.

24. The system as claimed in claim 21, wherein the music playback unit comprises a digital music device.

25. The system as claimed in claim 21, wherein the music playback unit comprises a MP3 player.

26. The system as claimed in claim 21, wherein the profile storage and matching unit can determine match based on a criterion.

27. An interactive multi-party linking music listening system comprising at least two listening apparatuses communicating over a wireless ad-hoc network, wherein one of the listening apparatuses is a first listening apparatus, the first listening apparatus at least comprising:

a first signature to identify the first listening apparatus;

a plurality of channels for communicating between the listening apparatuses, wherein channels include at least one public channel for advertising the first signature;

a controlled interface for enabling interactive communication over the wireless ad-hoc network;

a random access controller for instructing the channels to be in use and storing signatures of listening apparatuses other than the first listening apparatus;

a wireless transceiver connected to the random access controller, for receiving and sending messages over the wireless ad-hoc network and relaying messages to the random access controller;

a display screen, for showing signatures or names or information of the listening apparatuses other than the first listening apparatus to a user;

a selection device that the user uses to accept or reject the listening apparatuses other than the first listening apparatus;

a music playback unit connected to the random access controller, for storing and playing music, whereby the first listening apparatus can synchronize playing music with the listening apparatuses other than the first listening apparatus with agreement from all parties.

28. The system as claimed in claim 27, wherein the wireless transceiver is implemented by short-range radio technologies.

29. The system as claimed in claim 27, wherein the wireless transceiver is implemented by a Bluetooth technology.

30. The system as claimed in claim 27, wherein the music playback unit comprises a digital music device.

31. The system as claimed in claim 27, wherein the music playback unit comprises a MP3 player.

32. The system as claimed in claim 27, wherein the user can determine to accept or reject based on a criterion.

* * * * *